(12) United States Patent
Morioka et al.

(10) Patent No.: US 6,893,775 B2
(45) Date of Patent: May 17, 2005

(54) BATTERY HAVING ACTIVE MATERIAL CONTAINING NEUTRAL CARBON RADICAL COMPOUND

(75) Inventors: Yukiko Morioka, Tokyo (JP); Masaharu Satoh, Tokyo (JP); Shigeyuki Iwasa, Tokyo (JP); Yutaka Bannai, Tokyo (JP); Kentaro Nakahara, Tokyo (JP)

(73) Assignee: NEC Corporation, Tokyo (JP)

( * ) Notice: Subject to any disclaimer, the term of this patent is extended or adjusted under 35 U.S.C. 154(b) by 437 days.

(21) Appl. No.: 09/969,996

(22) Filed: Oct. 4, 2001

(65) Prior Publication Data
US 2002/0041996 A1 Apr. 11, 2002

(30) Foreign Application Priority Data
Oct. 6, 2000 (JP) .................................. 2000-308336

(51) Int. Cl.⁷ .............................................. H01M 4/60
(52) U.S. Cl. ...................................... 429/213; 429/231.8
(58) Field of Search .............................. 429/213, 231.8

(56) References Cited
U.S. PATENT DOCUMENTS 4,397,922 A * 8/1983 Pokhodenko et al. ....... 429/105
4,442,187 A 4/1984 MacDiarmid et al.
4,833,048 A 5/1989 Dejonghe et al.

FOREIGN PATENT DOCUMENTS

| JP | 59-196570 | 11/1984 |
| JP | 2715778 | 11/1997 |
| JP | 09320592 A | * 12/1997 ............ H01M/4/58 |

OTHER PUBLICATIONS

Hawley's Condensed Chemical Dictionary, Van Nostrand Reinhold Company, NY, p. 989, 1993.*

* cited by examiner

Primary Examiner—Alexander Markoff
(74) Attorney, Agent, or Firm—McGinn & Gibb, PLLC

(57) ABSTRACT

A battery includes active material containing neutral carbon radical compound at one of or both of the electrodes, and the neutral carbon radicals participate in electrode reaction for generating current; the battery is light, because any heavy metal is not required for the active material, and the battery achieves large capacity without sacrifice of stability, because the unpaired electrons are localized at the carbon atoms in the neutral carbon radical compound.

11 Claims, 1 Drawing Sheet

BATTERY HAVING ACTIVE MATERIAL CONTAINING NEUTRAL CARBON RADICAL COMPOUND

FIELD OF THE INVENTION

This invention relates to a battery and, more particularly, to a battery for generating electric power through electrode reaction at a pair of electrodes.

DESCRIPTION OF THE RELATED ART

A battery converts the chemical energy to the electric energy and vice versa, and accumulates the electric energy in the form of chemical energy through oxidation-reduction. The battery is used as a power source in various electric devices.

Portable electronic devices are rapidly spread, and a large-capacity and small-weight battery is required for the portable electronic devices. Thus, there is a great demand for the large-capacity and small-weight battery. Research and development efforts have been made on a battery, which uses alkaline metal ion, because the alkaline metal ion is small in mass per unit charge. Especially, the lithium ion battery is a large capacity stable battery, and is employed in the portable electronic devices. The lithium ion battery has a positive electrode formed of lithium-containing heavily metal oxide and a negative electrode formed of carbon, and converts the energy through the elimination reaction of lithium and the reverse reaction. However, the lithium ion battery is small in capacity per unit mass. This is because of the fact that the heavily metallic compound, which is large in specific gravity, is used for the positive electrode. Thus, the lithium ion battery can not perfectly satisfy the requirement for the portable electronic devices.

A battery which does not need any heavy metal compound is required. Candidates are disclosed in U.S. Pat. No. 4,833,048 and Japanese Patent No. 2715778. The batteries have the positive electrodes formed of organic compound with disulfide linkage. The principle employed in the batteries is an electrochemical oxidation/reduction reaction where disulfide linkages are produced and dissociated. The positive electrode is formed of compound, the main components of which are light elements such as sulfur and carbon. For this reason, the batteries are fairly reduced in weight, and are near the technical goal.

Conductive polymer compounds are also available for the batteries. The principle of the battery is the doping reaction of electrolyte ion to the conductive polymer compound and the undoping reaction. The doping reaction means a phenomenon where exitons such as solitons or polarons, which are generated in the oxidation-reduction of the conductive polymer compound, are stabilized with counter ions. On the other hand, the undoping reaction is reverse to the doping reaction. The exitons stabilized with the counter ions are electrochemically oxidized or reduced in the undoping reaction.

U.S. Pat. No. 4,442,187 discloses a battery which has a positive electrode or a negative electrode formed of the conductive polymer compound. Since the conductive polymer compound is composed of light elements such as carbon and nitrogen, the battery is expected to achieve large capacity. However, the exitons generated through the oxidation-reduction are delocalized in the π electron conjugate system, and they interact each other. This results in a limit to the concentration of exitons, and the battery can not sufficiently increase the capacity.

As described hereinbefore, research and development efforts have been made on a large energy density and large capacity stable battery without using the heavy metal oxides. However, the prior art batteries do not satisfy the user. It is also difficult that the lithium ion battery achieve a large capacity due to the positive electrode formed of heavy meal oxides.

SUMMARY OF THE INVENTION

It is therefore an important object of the present invention to provide a battery, which is high in energy density, large in capacity, small in environmental influence, light and stable.

To accomplish the object, the present invention proposes to use neutral carbon radical compound as active material of battery.

In accordance with one aspect of the present invention, there is provided a battery for generating electric power through an electrode reaction, and the battery comprises a pair of electrodes containing two kinds of active material, at least one of which is formed of a neutral carbon radical compound.

In accordance with another aspect of the present invention, there is provided a battery for generating electric power through an electrode reaction comprising a positive electrode having a first active material and a negative electrode having a second active material different from the first active material, and at least one of said first and second active materials contains a neutral carbon radical compound.

In accordance with yet another aspect of the present invention, there is provided a battery for generating electric power through an electrode reaction comprising a positive electrode having a first active material, a negative electrode having a second active material different from the first active material and a separator having an electrolyte, and provided between the positive electrode and the negative electrode, and at least one of the first active material, the second active material and the electrolyte contains a neutral carbon radical compound.

The neutral carbon radical compound may be expressed by general formula

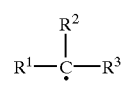

[1]

where each of the substituents $R^1$, $R^2$ and $R^3$ bonded to the carbon radical is selected from the candidate group consisting of hydrogen, halogen atoms, hydroxyl group, nitro group, nitroso group, cyano group, alkyl group, substituted alkyl group, alkenyl group, substituted alkenyl group, cycloalkyl group, substituted cycloalkyl group, aromatic group, substituted aromatic group, aralkyl group, substituted aralkyl group, amino group, substituted amino group, alkoxy group, substituted alkoxy group, aryloxy group, substituted aryloxy group, alkoxycarbonyl group, substituted alkoxycarbonyl group, aryloxycarbonyl group, substituted aryloxycarbonyl group, acyl group, substituted acyl group and carboxyl group. Two of $R^1$, $R^2$ and $R^3$ may form ring. Sulfur atom, silicon atom, phosphorous atom or boron atom may be substituted for at least one atom in each of the substituents. In case where $R^1$, $R^2$ or $R^3$ contains hydroxyl group, the hydroxyl group may form salt together with metal atom. One of the substituents $R^1$, $R^2$ and $R^3$ may link with the substituent $R^1$, $R^2$ or $R^3$ of other molecules to form polyradical.

One of the substituents $R^1$, $R^2$ and $R^3$ may serve as one of the substituents $R^1$, $R^2$ and $R^3$ of other molecules. In this instance, the substituent may be bounded with the radical carbon for producing the polyradical. These polyradicals may form a chain or ring. The polyradicals may branch so as to form a network structure.

It is preferable that at least one of the substituents $R^1$, $R^2$ and $R^3$ is the alkenyl group or the substituted alkenyl group in the neutral carbon radical compound expressed by general formula [1].

It is also preferable that at least one of the substituents $R^1$, $R^2$ and $R^3$ is the aromatic group or the substituted aromatic group in the neutral carbon radical compound expressed by general formula [1]. The aromatic group may be phenyl group or fluorenyl group.

It is also preferable that each of the substituents $R^1$, $R^2$ and $R^3$ is the aromatic group or the substituted aromatic group. The aromatic group may be phenyl group.

It is preferable that the neutral carbon radical is 9-fluorenyl radical or substituted 9-fluorenyl radical.

It is preferable that the neutral carbon radical compound is high-molecular weight radical compound. The high-molecular weight radical compound may have polyolefin structure. The high-molecular weight radical compound may have polyacetylene structure. The neutral carbon radical compound may have a high-molecular weight compound with a three-dimensional network structure.

It is preferable that the neutral carbon radical compound has the spin concentration equal to or greater than $10^{21}$ spins/g.

BRIEF DESCRIPTION OF THE DRAWINGS

The features and advantages of the battery will be more clearly understood from the following description taken in conjunction with the accompanying drawings in which.

DESCRIPTION OF THE PREFERRED EMBODIMENTS

Figure 1:
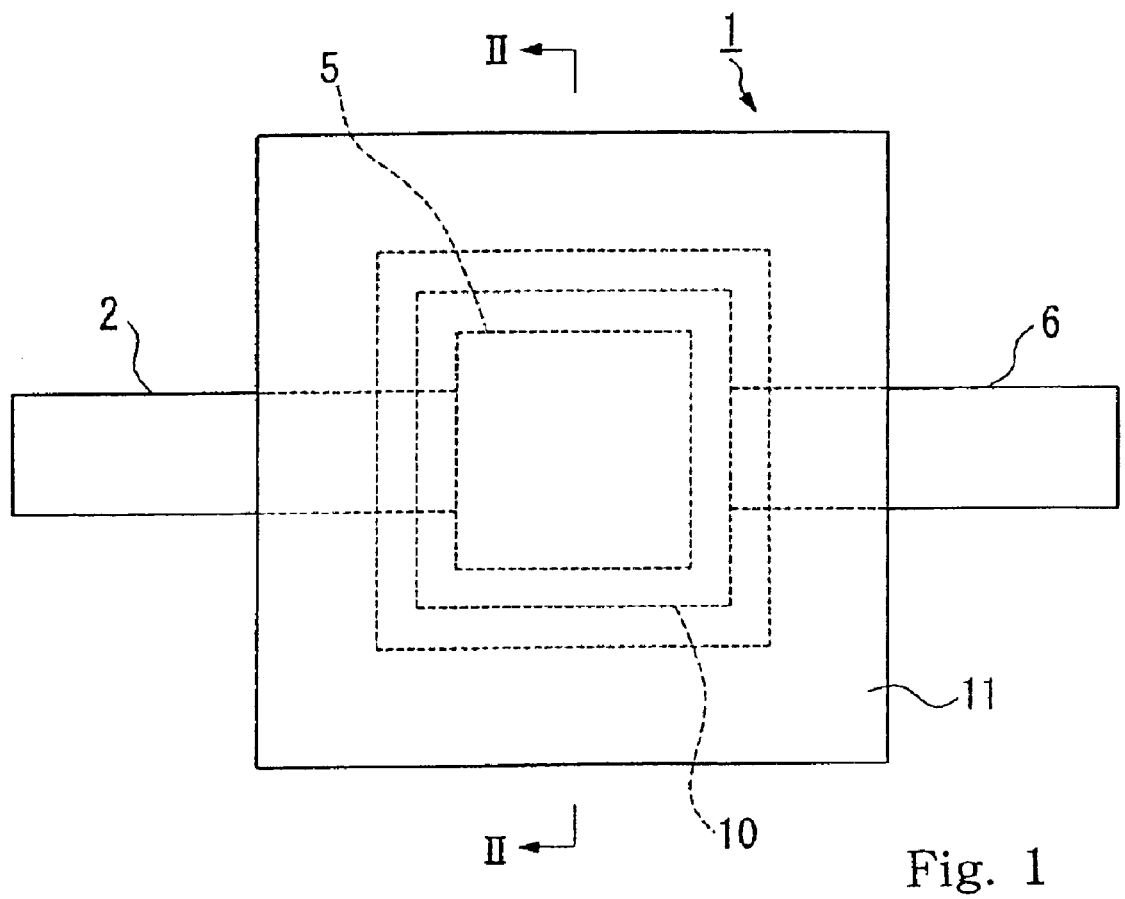
FIG. 1 is a plane view showing the arrangement of a battery according to the present invention.
Figure 2:
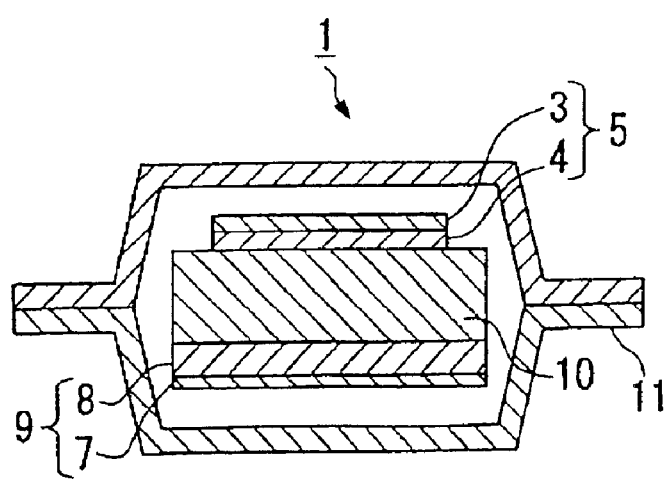
FIG. 2 is a cross sectional view taken along line II—II of FIG. 1 and showing the structure of the battery.

Referring to FIG. 1 of the drawings, a battery embodying the present invention largely comprises a negative electrode 5, a positive electrode 9 and a separator 10. The negative electrode 5 includes a negative current collector 3 and a negative electrode layer 4, and a negative terminal 2 is connected to the negative electrode 5. On the other hand, the positive electrode 9 includes a positive current collector 7 and a positive electrode layer 8, and a positive terminal 6 is connected to the positive electrode 9. The separator 10 contains electrolyte, and is sandwiched between the negative electrode 5 and the positive electrode 9. Thus, the battery has a laminated structure, and the laminated structure is sealed in a case formed from protective films 11.

At least one of the negative electrode layer 4, the positive electrode layer 8 and electrolyte of the separator 10 contains the neutral carbon radical serving as active material. The active material directly participates in the electrode reaction, i.e., the charging reaction and the discharging reaction, and is indispensable substance in the battery. The active material may be solid, or dissolved or dispersed in electrolyte.

The neutral carbon radical is a chemical species having unpaired electron on the carbon atom. The neutral carbon radical compound includes the chemical species. In general, "radical" is a reactive chemical species, and is usually unstable produced as an intermediate product in chemical reactions. For this reason, the unstable radical reacts with substances therearound, and, accordingly, is extinguished upon expiry of certain life time.

The neutral carbon radical compound according to the present invention has a certain spin concentration. It is preferable that the spin concentration is equal to or greater than $10^{19}$ spins/g at all times. It is more preferable that the spin concentration is equal to $1e$ greater than $10^{21}$ spins/g. The spin concentration may be evaluated through an electron spin resonance spectrum. In case where the neutral carbon radical is found in a stable compound, the neutral carbon radical compound enhances the stability of the battery. It is desirable that the neutral carbon radical has a long life time. The environmental factors such as, for example, solvent have influence on the life time of the neutral carbon radical.

There are neutral carbon radical compounds which are hardly bonded with environmental substances. These neutral carbon radical compounds stably exist for a relatively long time period, because the neutral carbon radical is stabilized by virtue of delocalization of the $\pi$ electrons or steric hindrance created by organic protective group. When the spin concentration is estimated through the electron spin resonance analysis, the neutral carbon radical compound maintains the spin concentration in the range between $10^{19}$ spins/g and $10^{23}$ spins/g for a long time period. It is preferable that the neutral carbon radical compound according to the present invention keeps the spin concentration equal to or greater than $10^{21}$ spins/g for in equilibrium at least one second.

The neutral carbon radical compound expressed by general formula [1] has a large energy density per unit mass, and is appropriate for the active material of the large capacity stable battery.

The neutral carbon radical compound has the substituents for carbon radicals each selected from the candidate group consisting of hydrogen, halogen atoms, hydroxyl group, nitro group, nitroso group, cyano group, alkyl group, substituted alkyl group, alkenyl group, substituted alkenyl group, cycloalkyl group, substituted cycloalkyl group, aromatic group, substituted aromatic group, aralkyl group, substituted aralkyl group, amino group, substituted amino group, alkoxy group, substituted alkoxy group, aryloxy group, substituted aryloxy group, alkoxycarbonyl group, substituted alkoxycarbonyl group, aryloxycarbonyl group, substituted aryloxycarbonyl group, acyl group, substituted acyl group and carboxyl group. Two of $R^1$, $R^2$ and $R^3$ may form ring. Sulfur atom, silicon atom, phosphorous atom or boron atom is substituted for at least one atom in each of the substituents. In case where $R^1$, $R^2$ or $R^3$ contains hydroxyl group, the hydroxyl group may form salt together with metal atom.

The halogen atoms are, by way of example, fluorine, chlorine, bromine and iodine.

Examples of the substituted/non-substituted alkyl group are methyl group, ethyl group, propyl group, isopropyl group, n-butyl group, s-butyl group, iso-butyl group, t-butyl group, n-pentyl group, n-hexyl group, n-heptyl group, n-octyl group, hydroxymethyl group, 1-hydroxyethyl group, 2-hydroxyethyl group, 2-hydroxyisobutyl group, 1,2-dihydroxyethyl group, 1,3-dihydroxyisopropyl group, 2,3-dihydroxy-t-butyl group, 1,2,3-trihydroxypropyl group, chloromethyl group, 1-chloroethyl group, 2-chloroethyl group, 2-chloroisobutyl group, 1,2-dichloroethyl group, 1,3-dichloro-iso-propyl group, 2,3-dichloro-t-butyl group, 1,2, 3-trichloropropyl group, bromomethyl group, 1-bromoethyl group, 2-bromoethyl group, 2-bromoisobutyl group, 1,2-dibromoethyl group, 1,3-dibromoisopropyl group, 2,3-dibromo-t-butyl group, 1,2,3-tribromopropyl group, iodomethyl group, 1-iodoethyl group, 2-iodoethyl group, 2-iodoisobutyl group, 1,2-diiodoethyl group, 1,3-diiodoisopropyl group, 2,3-diiodo-t-butyl group, 1,2,3-triiodo-propyl group, aminomethyl group, 1-aminoethyl group, 2-aminoethyl group, 2-aminoisobutyl group, 1,2-diaminoethyl group, 1,3-diaminoisopropyl group, 2,3-diamino-t-butyl group, 1,2,3-triaminopropyl group, cyanomethyl group, 1-cyanoethyl group, 2-cyanoethyl group, 2-cyanoisobutyl group, 1,2-dicyanoethyl group, 1,3-dicyanoisopropyl group, 2,3-dicyano-t-butyl group, 1,2,3-tricyanopropyl group, nitromethyl group, 1-nitroethyl group, 2-nitroethyl group, 2-nitroisobutyl group, 1,2-dinitroethyl group, 1,3-dinitroisopropyl group, 2,3-dinitro-t-butyl group and 1,2,3-trinitropropyl group.

Examples of the substituted/non-substituted alkenyl group are vinyl group, allyl group, 1-butenyl group, 2-butenyl group, 3-butenyl group, 1,3-butandienyl group, 1-methylvinyl group, styryl group, 4-diphenylaminostyryl group, 4-di-p-tolylaminostyryl group, 4-di-m-tolylaminostyryl group, 2, 2diphenylvinyl group, 1,2-diphenylvinyl group, 1-methylallyl group, 1,1-dimethylallyl group, 2-methylallyl group, 1-phenylallyl group, 2-phenylallyl group, 3-phenylallyl group, 3,3-diphenylallyl group, 1,2-dimethylallyl group, 1-phenyl-1-butenyl group and 3-phenyl-1-butenyl group.

Examples of the substituted/non-substituted cycloalkyl group are cyclopropyl group, cyclobutyl group, cyclopentyl group, cylcohexyl group and 4-methylcyclohexyl group.

Examples of the substituted/non-substituted aromatic group are phenyl group, 1-naphtyl group, 2-naphthyl group, 9-fluorenyl group, 1-anthryl group, 2-anthryl group, 9-anthryl group, 1-phenanthryl group, 2-phenanthryl group, 3-phenanthryl group, 4-phenanthryl group, 9-phenanthryl group, 1-naphthasenyl group, 2-naphthasenyl group, 9-naphthasenyl group, 1-pyrenyl group, 2-pyrenyl group, 4-pyrenyl group, 2-biphenylil group, 3-biphenylil group, 4-biphenylil group, p-terphenyl-4-il group, p-terphenyl-3-il group, p-terphenyl-2-il group, m-terphenyl-4-il group, m-terphenyl-3-il group, m-terphenyl-2-il group, o-tolyl group, m-tolyl group, p-tolyl group, p-t-butylphenyl group, p-(2-phenylpropyl) phenyl group, 3-methyl-2-naphthyl group, 4-methyl-1-naphthyl group, 4-methyl-1-anthryl group, 4'-methylbiphenylil group, 4"-t-butyl-p-terphenyl-4-il group, 1-pyrolyl group, 2-pyrolyl group, 3-pyrolyl group, pyrazinyl group, 2-pyridinyl group, 3-pyridinyl group, 4-pyridinyl group, 1-indolyl group, 2-indolyl group, 3-indolyl group, 4-indolyl group, 5-indolyl group, 6-indolyl group, 7-indolyl group, 1-isoindolyl group, 2-isoindolyl group, 3-isoindolyl group, 4-isoindolyl group, 5-isoindolyl group, 6-isoindolyl group, 7-isoindolyl group, 2-furil group, 3-furil group, 2-benzofuranyl group, 3-benzofuranyl group, 4-benzofuranyl group, 5-benzofuranyl group, 6-benzofuranyl group, 7-benzofuranyl group, 1-isobenzofuranyl group, 3-isobenzofuranyl group, 4-isobenzofuranyl group, 5-isobenzofuranyl group, 6-isobenzofuranyl group, 7-isobenzofuranyl group, 2-quinolyl group, 3-quinolyl group, 4-quinolyl group, 5-quinolyl group, 6-quinolyl group, 7-quinolyl group, 8-quinolyl group, 1-isoquinolyl group, 3-isoquinolyl group, 4-isoquinolyl group, 5-isoquinolyl group, 6-isoquinolyl group, 7-isoquinolyl group, 8-isoquinolyl group, 2-quinoxalinyl group, 5-quinoxalinyl group, 6-quinoxalinyl group, 1-carbazolyl group, 2-carbazolyl group, 3-carbazolyl group, 4-carbazolyl group, 9-carbazolyl group, 1-phenanthridinyl group, 2-phenanthridinyl group, 3-phenanthridinyl group, 4-phenanthridinyl group, 6-phenanthridinyl group, 7-phenanthridinyl group, 8-phenanthridinyl group, 9-phenanthridinyl group, 10-phenanthridinyl group, 1-acridinyl group, 2-acridinyl group, 3-acridinyl group, 4-acridinyl group, 9acridinyl group, 1-7-phenanthroline-2-il group, 1-7-phenanthroline-3-il group, 1-7-phenanthroline-4-il group, 1-7-phenanthroline-5-il group, 1-7-phenanthroline-6-il group, 1-7-phenanthroline-8-il group, 1-7-phenanthroline-9-il group, 1-7-phenanthroline-10-il group, 1-8-phenanthroline-2-il group, 1-8-phenanthroline-3-il group, 1-8-phenanthroline-4-il group, 1-8-phenanthroline-5-il group, 1-8-phenanthroline-6-il group, 1-8-phenanthroline-7-il group, 1-8-phenanthroline-9-il group, 1-8-phenanthroline-10-il group, 1-9-phenanthroline-2-il group, 1-9-phenanthroline-3-il group, 1-9-phenanthroline-4-il group, 1-9-phenanthroline-5-il group, 1-9-phenanthroline-6-il group, 1-9-phenanthroline-7-il group, 1-9-phenanthroline-8-il group, 1-9-phenanthroline-10-il group, 1-10-phenanthroline-2-il group, 1-10-phenanthroline-3-il group, 1-10-phenanthroline-4-il group, 1-10-phenanthroline-5-il group, 1-10-phenanthroline-2-il group, 2-9-phenanthroline-1-il group, 2-9-phenanthroline-3-il group, 2-9-phenanthroline-4-il group, 2-9-phenanthroline-5-il group, 2-9-phenanthroline-6-il group, 2-9-phenanthroline -7-il group, 2-9-phenanthroline-8-il group, 2-9-phenanthroline-10-il group, 2-8-phenanthroline-1-il group, 2-8-phenanthroline-3-il group, 2-8-phenanthroline-4-il group, 2-8-phenanthroline-5-il group, 2-8-phenanthroline-6-il group, 2-8-phenanthroline-7-il group, 2-8-phenanthroline-9-il group, 2-7-phenanthroline-1-il group, 2-7-phenanthroline-3-il group, 2-7-phenanthroline-4-il group, 2-7-phenanthroline-5-il group, 2-7-phenanthroline-6-il group, 2-7-phenanthroline-8-il group, 2-7-phenanthroline-9-il group, 2-7-phenanthroline-10-il group, 1-phenazinyl group, 2-phenazinyl group, 1-phenothiazinyl group, 2-phenothiazinyl group, 3-phenothiazinyl group, 4-phenothiazinyl group, 10-phenothiazinyl group, 1-phenoxazinyl group, 2-phenoxazinyl group, 3-phenoxazinyl group, 4-phenoxazinyl group, 10-phenoxazinyl group, 2-oxazolyl group, 4-oxazolyl group, 5-oxazolyl group, 2-oxadiazolyl group, 5-oxadiazolyl group, 3-furazanyl, 2-thienyl group, 3-thienyl group, 2-methylpyrrole-1-il group, 2-methylpyrrole-3-il group, 2-methylpyrrole-4-il group, 2-methylpyrrole-5-il group, 3-methylpyrrole-1-il group, 3-methylpyrrole-2-il group, 3-methylpyrrole-4-il group, 3-methylpyrrole-5-il group, 2-t-buthylpyrrole-4-il group, 3-(2-phenylpropyl) pyrrole-1-il group, 2-methyl-1-indolyl group, 4-methyl-1-indolyl group, 2-methyl-3-indolyl group, 4-methyl-3-indolyl group, 2-t-buthyl-1-indolyl group, 4-t-buthyl-1-indolyl group, 2-t-buthyl-3-indolyl group and 4-t-buthyl-3-indolyl group.

Examples of the substituted/non-substituted aralkyl group are benzyl group, 1-phenylethyl group, 2-phenylethyl group, 1-phenylisopropyl group, 2-phenylisopropyl group, phenyl-t-butyl group, α-naphtyl group, 1-α-naphthylethyl group, 2-α-naphthylethyl group, 1-α-naphthylisopropyl group, 2-α-naphthylisopropyl group, β-naphthylmethyl group, 1-β-naphthylethyl group, 2-β-naphthylethyl group, 1-β-naphthylisopropyl group, 2-β-naphthyl-isopropyl group, 1-pyrolylmethyl group, 2-(1-pyrolyl)ethyl group, p-methylbenzyl group, m-methylbenzyl group, o-methylbenzyl group, p-chlor-benzyl group, m-chlorbenzyl group, o-chlorbenzyl group, p-bromobenzyl group, m-bromobenzyl group, o-bromobenzyl group, p-iodobenzyl group, m-iodobenzyl group, o-iodobenzyl group, p-hydroxybenzyl group, m-hydroxy-benzyl group, o-hydroxybenzyl group, p-aminobenzyl group, m-aminobenzyl group, o-aminobenzyl group, p-nitrobenzyll group, m-nitrobenzyl group, o-nitrobenzyl group, p-cyanobenzil group, m-cyanobenzyl group, o-cyanobenzyl group, 1-hygroxy-2-phenylisopropyl group and 1-chlor-2-phenylisopropyl group.

Examples of the substituted/non-substituted amino group are expressed as —N $X^1X^2$, and each of $X^1$ and $X^2$ is hydrogen, the above-mentioned substituted/non-substituted alkyl group, the above-mentioned substituted/non-substituted alkenyl group, the above-mentioned substituted/non-substituted cycloalkyl group, the above-mentioned aromatic group or above-mentioned substituted/non-substituted aralkyl group.

Examples of the substituted/non-substituted alkoxy group are expressed as —$OX^3$, and examples of $X^3$ are the above-mentioned substituted/non-substituted alkyl group, the above-mentioned substituted/non-substituted cycloalkyl group or the above-mentioned substituted/non-substituted aralkyl group.

Examples of the substituted/non-substituted aryloxy group are expressed as —$OX^4$, and examples of $X^4$ are the above-mentioned substituted/non-substituted aromatic group.

Examples of the substituted/non-substituted alkoxycarbonyl group are expressed as —$COOX^5$, and examples of $X^5$ are the above-mentioned substituted/non-substituted alkyl group, the above-mentioned substituted/non-substituted cycloalkyl group and the above-mentioned substituted/non-substituted aralkyl group.

Examples of the substituted/non-substituted aryloxycarbonyl group are expressed as —$COOX^6$, and examples of $X^6$ are the above-mentioned substituted/non-substituted aromatic group.

Examples of the substituted/non-substituted acyl group are expressed as —$C(=O)X^7$, and examples of $X^7$ are hydrogen, the above-mentioned substituted/non-substituted alkyl group, the above-mentioned substituted/non-substituted alkenyl group, the above-mentioned substituted/non-substituted cycloalkyl group, the above-mentioned substituted/non-substituted aromatic group and the above-mentioned substituted/non-substituted aralkyl group.

In case where the substituent contains hydroxyl group, metal atom may form salt together with the hydroxyl group. The metal atom may be alkaline metal or alkaline earth metal such as sodium, potassium and magnesium.

Although examples of the neutral carbon radical compound are described hereinbelow, these examples do not set a limit to the present invention. The examples are expressed by chemical formulae [2] to [32], and these chemical formulae are written in the last nine pages of the description of preferred embodiments.

An example of the neutral carbon radical compound is triarylmethyl radical compound expressed by chemical formula [2], and poly (triarylmethyl) radical compounds are also examples of the neutral carbon radical compound. The poly (triarylmethyl) radical compounds are expressed by chemical formulae [3] to [18]. Other examples of the neutral carbon radical compounds are high-molecular weight triarylmethyl radical compounds which are expressed by chemical formulae [19] to [21]. Other examples of the neutral carbon radical compound are 1,3-bisphenylene-2-phenylallyl radical compound, and chemical formula [22] expresses the 1,3-bisphenylene-2-phenylallyl radical compound. High-molecular weight 1,3-bisphenylene-2-phenylallyl radical compounds are also examples of the neutral carbon radical compound, and are expressed by chemical formulae [23] and [24]. Pentaphenylcyclopentadienyl radical compound is still another example of the neutral carbon radical compound, and is expressed by chemical formula [25]. Chemical formula [26] expresses undecachlorodiphenylmethyl radical compound which is another example of the neutral carbon radical compound. Heptaphenylcycloheptatrienyl radical compound is another example of the neutral carbon radical compound, and is expressed by chemical formula [27]. Pyridinyl radical compounds and bisfluorenylmethyl radical compound are other examples of the neutral carbon radical compound, and are expressed by chemical formulae [28] and [29] and chemical formula [30]. Chemical formulae [31] and [32] express other examples of the neutral carbon radical compound available for the battery according to the present invention. Carvene compounds are also available for the battery according to the present invention.

The neutral carbon radical compound is in the form of low-molecular weight compound and high-molecular compound. The neutral carbon radical compound may form a part of the chemical structure of a high-molecular weight compound. More than one example of the neutral carbon radical compound may be mixed into and used as the active material.

The active material containing the neutral carbon radical compound is available for the electrode reaction at one of or both of the positive and negative electrodes 5/9. In case where the active material is used in the electrode reaction at one of the positive and negative electrodes 5/9, conventional active material is available for the electrode reaction at the other of the positive and negative electrodes 5/9.

The neutral carbon radical compound is assumed to be used at the negative electrode. The active material at the positive electrode may be metal oxide grains, disulfide compound or conductive polymer compound. An example of the metal oxide is lithium manganese oxide such as, for example, $LiMnO_2$ and $Li_xMn_2O_4$ where x is greater than zero and less than 2. Lithium manganese oxide spinel, $MnO_2$, $LiCoO_2$, $LiNO_2$ and $Li_xV_2O_5$ where x is greater than zero and less than 2 are also available for the active material at the positive electrode. Examples of the conductive polymer compounds are polyacetylene, polyphenylene, polyaniline and polypyrrole. One of these kinds of conventional active material may be solely used at the positive electrode. Otherwise, more than one kind of conventional active material may be mixed in and used as the active material at the positive electrode. The conventional active material may be mixed with the neutral carbon radical compound according to the present invention as composite active material at the positive electrode.

On the other hand, when the neutral carbon radical compound according to the present invention is used as the active material at the positive electrode, graphite, amorphous carbon, lithium metal, lithium alloy, lithium ion insertion carbon and conductive polymer compound are available for the active material at the negative electrode. These kinds of conventional active material are provided in an arbitrary shape. The lithium metal is, by way of example, provided in the form of thin section, bulk, solidified powder, fiber or flake. Any one of these kinds of conventional active material may be solely used in the negative electrode, or mixed with another kind of active material according to the present invention. The active material according to the present invention and the conventional active material may be mixed in a composite negative electrode.

Thus, the active material according to the present invention is available for any one of the positive and negative electrodes. The active material according to the present invention is small in mass and large in energy density than the conventional active material in the metal oxide series. From this viewpoint, it is preferable that the active material according to the present invention is used in the positive electrode.

While a battery according to the present invention is discharging, it is preferable for using the battery safety that the neutral carbon radical compound serves as the reactant in the electrode reaction at the positive electrode. Especially, when the reaction product forms a bond with electrolytic cation, which will be hereinlater described in detail, through the electrode reaction, the battery is further enhanced in safety. Any kind of cation is available for the reaction. However, the lithium ion is preferable from the viewpoint of the capacity.

Conductive adjuvant and ionic conduction adjuvant may be mixed with the neutral carbon radical compound. These kinds of adjuvant are expected to reduce the impedance. The conductive adjuvant may be carbonaceous fine grains such as, for example, graphite, carbon black and acetylene black, or conductive polymer compound such as, for example, polyaniline, polypyrrole, polythiophene, polyacetylene and polyacene. The ion conduction adjuvant may be gel-electrolyte or solid electrolyte.

In order to enhance the bonding force among the components, binder may be contained. The binder may be resin binder such as, for example, polyfluorovinylidene, vinylidenefluoride-hexfluoropropylene copolymer, vinylidenefluoride-tetrafluoroethylene copolymer, styrene-butadiene copolymerized rubber, polytetrafluoroethylene, polypropylene, polyethylene and polyimide.

In order to accelerate the electrode reaction, catalyst may be incorporated in the battery according to the present invention. The catalyst may be conductive polymer compound such as, for example, polyaniline, polypyrrole, polythiophene, polyacetylene and polyacene, basic compound such as, for example, pyridine derivative, pyrrolidone derivative, benzimidazole derivative, benzthiazole derivative and acridine, or metal ion complex.

A metallic foil, metallic plate, conductive mesh and carbon electrode are available for the negative current collector 3 and the positive current collector 7. The metallic foil/metallic plate may be formed of nickel, aluminum, copper, gold, silver, aluminum alloy or stainless. The negative current collector 3 and/or positive current collector 7 may have catalytic action. The negative current collector 3 and/or positive current collector 7 may be chemically bonded to the active material.

Meanwhile, a separator such as, for example, porous film and non-woven fabric may be provided in order to prevent the negative electrode/positive electrode from contact.

The electrolyte contained in the battery according to the present invention is expected to carry electric charge. The electrolyte has the ionic conductivity of the order of $10^{-5}$ to $10^{-1}$ S/cm at room temperature. The electrolyte may contain electrolytic salt which is dissolved in solvent. The electrolytic salt may be metal salt such as, for example, lithium salt expressed as $LiClO_4$, $LiPF_6$, $LiBF_4$, $LiCF_3SO_3$, $LiN(CF_3SO_2)_2$, $LiN(C_2F_5SO_2)_2$, $LiC(CF_3SO_2)_3$ and $LiC(C_2F_5SO_2)_3$.

The solvent may be organic solvent such as, for example, ethylene carbonate, propylene carbonate, dimethyl carbonate, diethyl carbonate, methylethyl carbonate, γ-butyrolactone, tetrahydrofuran, dioxoran, sulforan, dimethylformamido, dimethylacetoamido and N-methyl-2-pyrrolidone. More than one kind of solvent may be blended.

The electrolyte used in the battery according to the present invention may be high-molecular weight compound. The high-molecular weight compound may be high-molecular weight vinylidene fluoride compound series such as, for example, polyvinylidene fluoride, vinylidene fluoride-ethylene copolymer, vinylidene fluoride-monofluoroethylene copolymer, vinylidene fluoride-trifluoroethylene copolymer, vinylidene fluoride-tetrafluoroethylene copolymer, vinylidene fluoride-hexafluoropropylene copolymer and vinylidene fluoride-hexafluoropropylene-tetrafluoroethylene copolymer, or high-molecular weight acrylonitrile compound series such as, for example, acrylonitrile-methylmethacrylate copolymer, acrylonitrile-ethylmethacrylate copolymer, acrylonitrile-methylacrylate copolymer, acrylonitrile-ethylacrylate copolymer, acrylonitrile-methacrylic acid copolymer, acrylonitrile-acrylic acid copolymer and acrylonitrile-vinylacetate copolymer. The high-molecular weight compound available for the electrolyte may be polyethylene oxide, ethylene oxide-propylene oxide copolymer, acrylate of these oxides or methacrylate of those oxides. Although each of the high-molecular weight compounds may be solely used, the high-molecular weight compounds may contain electrolytic solution so as to form gel.

The battery according to the present invention may be formed in any conventional shape. The battery 1 has the laminated structure sealed in the case 11. The battery 1 may have a wound structure. The case 11 may be formed of metal or synthetic resin. A laminate film, which is formed from metal foils such as aluminum foils and synthetic resin films, is available for the package. The battery according to the present invention has the external appearance like a cylinder, box, disc or sheet. These external configurations do not set any limit on the present invention. The positive layer 8 and the negative layer 4 are produced through any conventional laminating process. The positive layer 8 and/or the negative layer 4 may have a multi-layered structure. The positive layer 8 and/or negative layer 4 may be held in contact with both of the associated current collector 3/7, and the lamination may be multiplied. The lamination may be wound.

The battery according to the present invention may be produced through a conventional process. The process may have the following steps. First, the active material is added to the solvent. Then, the active material and the solvent form slurry. The slurry is spread over the current collector, and the slurry and the current collector form in combination one of the electrodes. The electrode is opposed through the separator to the other electrode. Thus, the electrodes and the separator are formed in the laminated structure. The laminated structure is enclosed in the case. Otherwise, the laminated structure is wound, and, thereafter, enclosed in the case. The electrolyte is injected into the case, and is sealed in the case together with the laminated structure.

The neutral carbon radical compound per se forms part of the active material. Otherwise, the neutral carbon radical compound is produced through electrode reaction from certain compound sealed in the battery.

The present inventors discovered that the neutral carbon radical compound was useful as the active material at the electrode or electrodes, and made the present invention. In case where the neutral carbon radical compound is composed of light elements such as carbon, hydrogen and oxygen, the battery achieves a high energy density per unit mass. In the battery according to the present invention, only the neutral carbon radicals participate in the electrode reaction. This means that the cyclic characteristics are not dependent on the diffusion of the active material. For this reason, the battery according to the present invention is stable. The conductive polymer compound has exitons widely delocalized. On the other hand, reactive unpaired electrons are localized in the carbon atoms of the neutral carbon radical compound. The neutral carbon radical compound has more reactive parts than conductive polymer compound, and is conducive to a large capacity of the battery.

Description is hereinbelow made on several embodiments. However, the embodiments do not set any limit to the present invention.

First Embodiment

The present inventors fabricated a sample of the first embodiment as follows. First, a dry box was prepared. The dry box was equipped with a gas refining system, and argon atmosphere was created in the dry box. Ethylene carbonate was mixed with propylene carbonate at 1:1, and electrolytic salt expressed by chemical formula of $LiPF_6$ was dissolved in the ethylene carbonate/propylene carbonate mixture at 1 mol/l so as to prepare electrolytic solution. The present inventors mixed 60 milligrams of vinylidenefluoride-hexafluoropropylen copolymer in 140 milligrams of the electrolytic solution, and dissolved 1130 milligrams of tetrahydrofuran in the mixture at room temperature so as to obtain gel of electrolytic tetrahydrofuran. The electrolytic tetrahydrofuran gel served as the ion conduction adjuvant.

Subsequently, the present inventors put 30 milligrams of neutral carbon radical compound expressed by chemical formula [25] in a glass vessel, and mixed 60 milligrams of graphite powder with the neutral carbon radical compound. The graphite powder served as the conductive adjuvant. The present inventors mixed 200 milligrams of the electrolytic tetrahydrofuran gel with the resultant mixture. The present inventors further added 1000 milligrams of tetrahydrofuran. The tetrahydrofuran was homogenously mixed therein, and black slurry was obtained.

The present inventors prepared an aluminum foil connected to a lead. The aluminum foil measured 1.5 cm by 1.5 cm, and was 100 microns thick. 200 milligrams of the black slurry was dropped onto the aluminum foil, and was uniformly spread with a wire bar. The present inventors left the aluminum foil coated with the black slurry at room temperature for 60 minutes. The solvent, i.e., tetrahydrofuran was vaporized, and an organic compound layer was left on the aluminum foil. The organic compound contained the neutral carbon radical compound expressed by chemical formula [25].

The present inventors took a piece of the organic compound, and evaluated the spin concentration through the electron spin resonance spectrum. The spin concentration was equal to or greater than $10^{21}$ spins/g. Thus, the present inventors confirmed that the neutral carbon radical compound had been already produced in the initial stage of the fabrication.

Subsequently, the present inventors mixed 600 milligrams of vinyliden fluoride-hexafluoropropylen copolymer with 1400 milligrams of the electrolytic solution. The electrolytic solution contains $LiPF_6$ in the mixture of ethylene carbonate/propylene carbonate at 1 mol/1. The mixing ratio between the ethylene carbonate and the propylene carbonate was 1:1. 11.3 grams of tegrahydrofuran was mixed therein at room temperature. When the vinylidenefluoride-hexafluoropropylene copolymer was well dissolved, the resultant mixture was spread on a glass plate with a step, and was regulated to 1 millimeter thick. The solvent, i.e., tetrahydrofuran was dried after an hour, and an electrolytic gel layer of 150 microns thick was left on the glass plate.

Subsequently, a piece of the electrolytic gel was cut from the electrolytic gel layer, and was measured by 2.0 cm by 2.0 cm. The piece of the electrolytic gel was laminated on the aluminum foil coated with the organic compound layer, and a laminated foil was overlaid on the resultant lamination. The laminated foil was formed in combination with a lithium foil of 30 microns thick and a copper foil of 20 microns thick, and a lead was connected to the laminated foil. The resultant laminated structure was sandwiched between sheets of polytetrafluoroethylene. The sheets of polytetrafluoroethylene were 5 millimeters thick. Pressure was exerted on the sheets of polytetrafluoroethylene, and the sample was completed.

The aluminum foil coated with the organic compound layer and the laminated foil served as the positive electrode and the negative electrode, respectively. Constant electric current was discharged from the sample at 0.1 milliampere, and the current-to-voltage characteristics were investigated. A flat region was found at 2.2 volts, and the present inventors confirmed that the sample was worked as a battery.

After the discharging, the present inventors disassembled the sample, and cut a piece of organic compound containing the neutral carbon radical compound expressed by chemical formula [25] from the organic compound layer. The present inventors evaluated the spin concentration through the electron spin resonance spectrum. The spin concentration was $10^{19}$ spins/g. Thus, the neutral carbon radicals were reduced through the discharging.

The present inventors further fabricated samples of the battery as similar to the sample described hereinbefore. The present inventors measured the variation of voltage through repetition of charging/discharging. While the charging/discharging were being repeated ten times, the samples had continuously served as a secondary battery.

First Comparative Sample

The present inventors produced another kind of black slurry through the above-described process except the step of adding the neutral carbon radical compound expressed by chemical formula [25] into the glass vessel. The black slurry without containing the neutral carbon radical compound was spread over an aluminum foil as similar to the black slurry of the first embodiment, and a compound layer was formed on the aluminum foil. The present inventor cut a piece of compound from the compound layer, and evaluated the spin concentration through the electron spin resonance spectrum. The spin concentration was equal to or less than $10^{19}$ spins/g. Thus, the present inventors confirmed that the spin concentration in the compound was less than that of the organic compound containing the neutral carbon radical compound.

Subsequently, the electrolytic gel layer used in the first embodiment was laminated on the aluminum layer coated with the compound layer not containing any neutral carbon radical compound, and the laminated foil, i.e., the lamination of lithium foil/copper foil was further laminated thereon. The resultant laminated structure was sandwiched between the sheets of polytetrafluoroethylene, and pressure was exerted thereon as similar to the first embodiment. Thus, the comparative sample was similar to the samples of the first embodiment except the neutral carbon radical compound.

The aluminum foil coated with the compound layer and the laminated foil served as the positive electrode and the negative electrode of the battery. Constant current was discharged at 0.1 milliampere. The voltage was rapidly reduced. Thus, the comparative sample did not behave as a battery. The present inventors tried to charge the comparative sample by flowing constant current at 0.1 milliampere. The voltage was rapidly raised, and exceeded 3.0 volts. Although the comparative sample was discharged, any flat portion was not found in the plots showing the current-to-voltage characteristics. Thus, the comparative sample could not serve as a secondary battery.

Second Embodiment

The present inventors replaced the neutral carbon radical compound expressed by chemical formula [25] with the neutral carbon radical compound expressed by chemical formula [30]. Using the neutral carbon radical compound expressed by chemical formula [30], the present inventors produced black slurry as similar to that of the first embodiment. The black slurry was spread on an aluminum foil so as to form a compound layer containing the neutral carbon radical compound expressed by chemical formula [30]. The present inventors cut a piece of compound from the compound layer, and evaluated the spin concentration through the electron spin resonance spectrum. The spin concentration was equal to or greater than $10^{21}$ spins/g. Thus, the present inventors confirmed the radicals had been produced in the initial stage of the fabrication process.

The present inventors completed a sample of the battery implementing the second embodiment as similar to the first embodiment. The aluminum foil coated with the compound containing the neutral carbon radical compound served as a positive electrode, and the laminated foil of the lithium foil/copper foil served as a negative electrode. The present inventors flew constant current at 0.1 milliampere, and confirmed that the sample behaved as a battery.

The present inventors disassembled the sample, and cut a piece of compound from the compound layer on the aluminum foil. The present inventors evaluated the spin concentration in the piece of compound through the electron spin resonance spectrum. The spin concentration was equal to or less than $10^{19}$ spins/g. Thus, the present inventors confirmed that the neutral carbon radical compound expressed by chemical formula [30] lost the radicals through the discharging.

The present inventors repeated the charging/discharging ten times, and measured the battery voltage. It was confirmed that the sample of the second embodiment continuously behaved as a secondary battery during the repetition of charging/discharging.

Third Embodiment

The present inventors replaced the neutral carbon radical compound expressed by chemical formula [25] with the neutral carbon radical compound expressed by chemical formula [2]. Using the neutral carbon radical compound expressed by chemical formula [2], the present inventors produced black slurry as similar to that of the first embodiment. The black slurry was spread on an aluminum foil so as to form a compound layer containing the neutral carbon radical compound expressed by chemical formula [2]. The present inventors cut a piece of compound from the compound layer, and evaluated the spin concentration through the electron spin resonance spectrum. The spin concentration was equal to or greater than $10^{21}$ spins/g. Thus, the present inventors confirmed the radicals had been already produced in the initial stage of the fabrication process.

The present inventors completed a sample of the battery implementing the third embodiment as similar to the first embodiment. The aluminum foil coated with the compound containing the neutral carbon radical compound served as a positive electrode, and the laminated foil of the lithium foil/copper foil served as a negative electrode. The present inventors flew constant current at 0.1 milliampere, and confirmed that the sample behaved as a battery.

The present inventors disassembled the sample, and cut a piece of compound from the compound layer on the aluminum foil. The present inventors evaluated the spin concentration in the piece of compound through the electron spin resonance spectrum. The spin concentration was equal to or less than $10^{19}$ spins/g. Thus, the present inventors confirmed that the neutral carbon radical compound expressed by chemical formula [2] lost the radicals through the discharging.

The present inventors repeated the charging/discharging ten times, and measured the battery voltage. It was confirmed that the sample of the third embodiment continuously behaved as a secondary battery in the repetition of charging/discharging.

Fourth Embodiment

The present inventors replaced the neutral carbon radical compound expressed by chemical formula [25] with the neutral carbon radical compound expressed by chemical formula [5]. Using the neutral carbon radical compound expressed by chemical formula [5], the present inventors produced black slurry as similar to that of the first embodiment. The black slurry was spread on an aluminum foil so as to form a compound layer containing the neutral carbon radical compound expressed by chemical formula [5]. The present inventors cut a piece of compound from the compound layer, and evaluated the spin concentration through the electron spin resonance spectrum. The spin concentration was equal to or greater than $10^{21}$ spins/g. Thus, the present inventors confirmed the radicals had been already produced in the initial stage of the fabrication process.

The present inventors completed a sample of the battery implementing the fourth embodiment as similar to the first embodiment. The aluminum foil coated with the compound containing the neutral carbon radical compound served as a positive electrode, and the laminated foil of the lithium foil/copper foil served as a negative electrode. The present inventors flew constant current at 0.1 milliampere, and confirmed that the sample behaved as a battery.

The present inventors disassembled the sample, and cut a piece of compound from the compound layer on the aluminum foil. The present inventors evaluated the spin concentration in the piece of compound through the electron spin resonance spectrum. The spin concentration was equal to or less than $10^{19}$ spins/g. Thus, the present inventors confirmed that the neutral carbon radical compound expressed by chemical formula [5] lost the radicals through the discharging.

The present inventors repeated the charging/discharging ten times, and measured the battery voltage. It was confirmed that the sample of the fourth embodiment continuously behaved as a secondary battery in the repetition of charging/discharging.

Fifth Embodiment

The present inventors replaced the neutral carbon radical compound expressed by chemical formula [25] with the neutral carbon radical compound expressed by chemical formula [7]. Using the neutral carbon radical compound expressed by chemical formula [7], the present inventors produced black slurry as similar to that of the first embodiment. The black slurry was spread on an aluminum foil so as to form a compound layer containing the neutral carbon radical compound expressed by chemical formula [7]. The present inventors cut a piece of compound from the compound layer, and evaluated the spin concentration through the electron spin resonance spectrum. The spin concentration was equal to or greater than $10^{21}$ spins/g. Thus, the present inventors confirmed the radicals had been already produced in the initial stage of the fabrication process.

The present inventors completed a sample of the battery implementing the fifth embodiment as similar to the first embodiment. The aluminum foil coated with the compound containing the neutral carbon radical compound served as a positive electrode, and the laminated foil of the lithium foil/copper foil served as a negative electrode. The present inventors flew constant current at 0.1 milliampere, and confirmed that the sample behaved as a battery.

The present inventors disassembled the sample, and cut a piece of compound from the compound layer on the aluminum foil. The present inventors evaluated the spin concentration in the piece of compound through the electron spin resonance spectrum. The spin concentration was equal to or less than $10^{19}$ spins/g. Thus, the present inventors confirmed that the neutral carbon radical compound expressed by chemical formula [7] lost the radicals through the discharging.

The present inventors repeated the charging/discharging ten times, and measured the battery voltage. It was confirmed that the sample of the fifth embodiment continuously behaved as a secondary battery in the repetition of charging/discharging.

Sixth Embodiment

The present inventors replaced the neutral carbon radical compound expressed by chemical formula [25] with the neutral carbon radical compound expressed by chemical formula [22]. Using the neutral carbon radical compound expressed by chemical formula [22], the present inventors produced black slurry as similar to that of the first embodiment. The black slurry was spread on an aluminum foil so as to form a compound layer containing the neutral carbon radical compound expressed by chemical formula [22]. The present inventors cut a piece of compound from the compound layer, and evaluated the spin concentration through the electron spin resonance spectrum. The spin concentration was equal to or greater than $10^{21}$ spins/g. Thus, the present inventors confirmed the radicals had been already produced in the initial stage of the fabrication process.

The present inventors completed a sample of the battery implementing the sixth embodiment as similar to the first embodiment. The aluminum foil coated with the compound containing the neutral carbon radical compound served as a positive electrode, and the laminated foil of the lithium foil/copper foil served as a negative electrode. The present inventors flew constant current at 0.1 milliampere, and confirmed that the sample behaved as a battery.

The present inventors disassembled the sample, and cut a piece of compound from the compound layer on the aluminum foil. The present inventors evaluated the spin concentration in the piece of compound through the electron spin resonance spectrum. The spin concentration was equal to or less than $10^{19}$ spins/g. Thus, the present inventors confirmed that the neutral carbon radical compound expressed by chemical formula [22] lost the radicals through the discharging.

The present inventors repeated the charging/discharging ten times, and measured the battery voltage. It was confirmed that the sample of the sixth embodiment continuously behaved as a secondary battery in the repetition of charging/discharging.

Seventh Embodiment

The present inventors replaced the neutral carbon radical compound expressed by chemical formula [25] with the neutral carbon radical compound expressed by chemical formula [23]. Using the neutral carbon radical compound expressed by chemical formula [23], the present inventors produced black slurry as similar to that of the first embodiment. The black slurry was spread on an aluminum foil so as to form a compound layer containing the neutral carbon radical compound expressed by chemical formula [23]. The present inventors cut a piece of compound from the compound layer, and evaluated the spin concentration through the electron spin resonance spectrum. The spin concentration was equal to or greater than $10^{21}$ spins/g. Thus, the present inventors confirmed the radicals had been already produced in the initial stage of the fabrication process.

The present inventors completed a sample of the battery implementing the seventh embodiment as similar to the first embodiment. The aluminum foil coated with the compound containing the neutral carbon radical compound served as a positive electrode, and the laminated foil of the lithium foil/copper foil served as a negative electrode. The present inventors flew constant current at 0.1 milliampere, and confirmed that the sample behaved as a battery.

The present inventors disassembled the sample, and cut a piece of compound from the compound layer on the aluminum foil. The present inventors evaluated the spin concentration in the piece of compound through the electron spin resonance spectrum. The spin concentration was equal to or less than $10^{19}$ spins/g. Thus, the present inventors confirmed that the neutral carbon radical compound expressed by chemical formula [23] lost the radicals through the discharging.

The present inventors repeated the charging/discharging ten times, and measured the battery voltage. It was confirmed that the sample of the seventh embodiment continuously behaved as a secondary battery in the repetition of charging/discharging.

Eighth Embodiment

The present inventors replaced the neutral carbon radical compound expressed by chemical formula [25] with the neutral carbon radical compound expressed by chemical formula [21]. Using the neutral carbon radical compound expressed by chemical formula [21], the present inventors produced black slurry as similar to that of the first embodiment. The black slurry was spread on an aluminum foil so as to form a compound layer containing the neutral carbon radical compound expressed by chemical formula [21]. The present inventors cut a piece of compound from the compound layer, and evaluated the spin concentration through the electron spin resonance spectrum. The spin concentration was equal to or greater than $10^{21}$ spins/g. Thus, the present inventors confirmed the radicals had been already produced in the initial stage of the fabrication process.

The present inventors completed a sample of the battery implementing the eighth embodiment as similar to the first embodiment. The aluminum foil coated with the compound containing the neutral carbon radical compound served as a positive electrode, and the laminated foil of the lithium foil/copper foil served as a negative electrode. The present inventors flew constant current at 0.1 milliampere, and confirmed that the sample behaved as a battery.

The present inventors disassembled the sample, and cut a piece of compound from the compound layer on the aluminum foil. The present inventors evaluated the spin concentration in the piece of compound through the electron spin resonance spectrum. The spin concentration was equal to or less than $10^{19}$ spins/g. Thus, the present inventors confirmed that the neutral carbon radical compound expressed by chemical formula [21] lost the radicals through the discharging.

The present inventors repeated the charging/discharging ten times, and measured the battery voltage. It was confirmed that the sample of the eighth embodiment continuously behaved as a secondary battery in the repetition of charging/discharging.

As will be appreciated from the foregoing description, the active material contains the neutral carbon radical compound according to the present invention. Any heavily metal is not contained in the active material. For this reason, the battery according to the present invention achieves a high energy density and large capacity, and is light and stable.

The neutral carbon radical compound expressed by chemical formula [1] is composed of light elements, and, accordingly, makes the battery high in energy density per mass, large in capacity and stable.

At least one of the substituents $R^1$, $R^2$ and $R^3$ of the neutral carbon radical compound expressed by chemical formula [1] is preferably the substituted/non-substituted alkenyl group. The battery achieves a higher energy density and a larger capacity, and the stability is further enhanced.

In case where at one of the substituents $R^1$, $R^2$ and $R^3$ of the neutral carbon radical compound expressed by chemical formula [1] is the substituted/non-substituted aromatic group, the battery also achieves a higher energy density and a larger capacity, and the stability is further enhanced. If the phenyl group is selected from the aromatic group, the battery is further improved in the energy density, capacity and stability. If the fluorenyl group is selected from the aromatic group, the battery is also further improved in the energy density, capacity and stability.

In case where each of the substituents $R^1$, $R^2$ and $R^3$ is the aromatic group or the substituted aromatic group, the battery is improved in energy density, capacity and stability. When the substituents $R^1$, $R^2$ and $R^3$ are phenyl group, the battery is further improved in the energy density, capacity and stability.

In case where the neutral carbon radical is 9-fluorenyl radical or substituted 9-fluorenyl radical, the battery is further improved in energy density, capacity and stability.

When the neutral carbon radical compound is high-molecular weight radical compound, the battery is further improved in energy density, capacity and stability. The high-molecular weight radical compound may have polyolefin structure. In this instance, the battery is further improved in energy density, capacity and stability. In case where the high-molecular weight radical compound has polyacetylene structure, the battery is further improved in energy density, capacity and stability. When a high-molecular weight compound with a three-dimensional network structure is selected from the neutral carbon radical compound, the battery is also further improved in energy density, capacity and stability.

When the spin concentration is equal to or greater than $10^{21}$ spins/g, a very large capacity battery is obtained.

Although particular embodiments of the present invention have been shown and described, it will be apparent to those skilled in the art that various changes and modifications may be made without departing from the spirit and scope of the present invention.

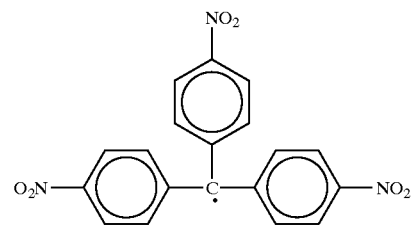

[2]

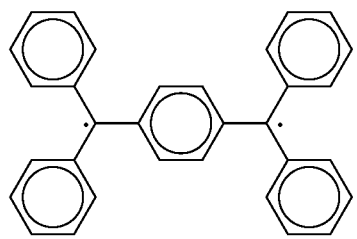

[3]

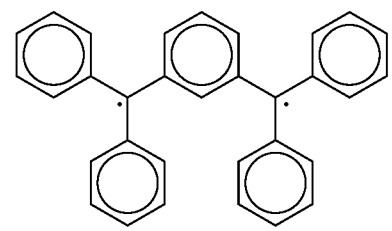

[4]

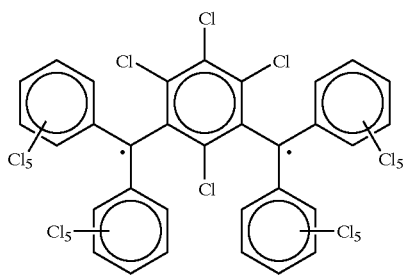

[5]

-continued
[6]
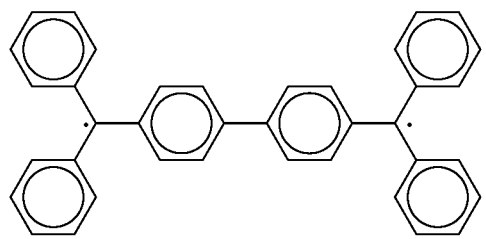
[7]
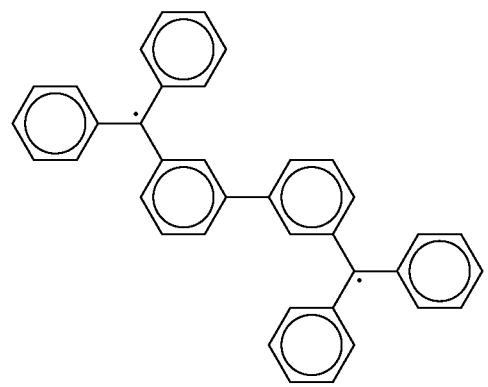
[8]
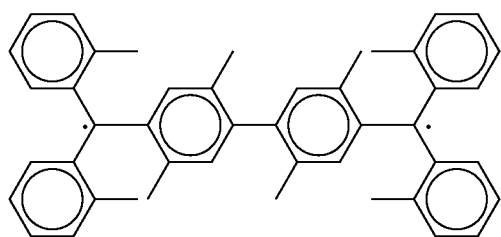
[9]
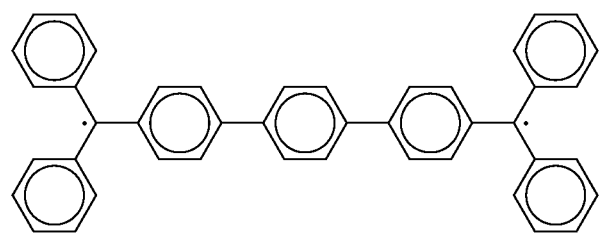
[10]
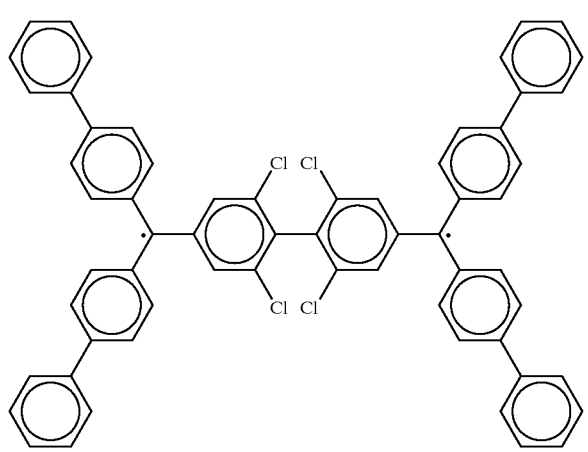
[11]
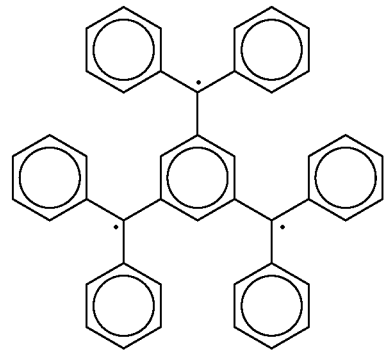
[12]
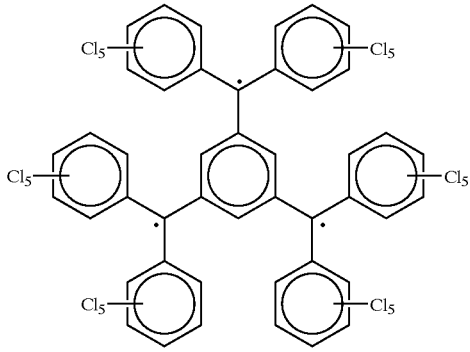
[13]
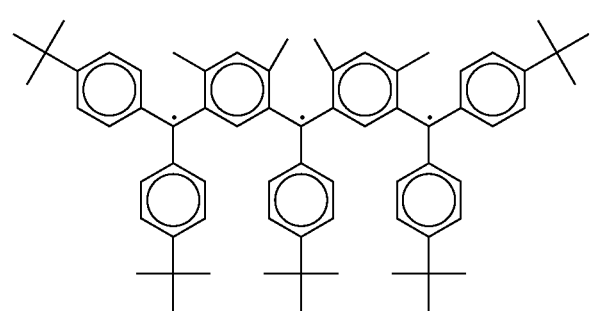

-continued
[14]
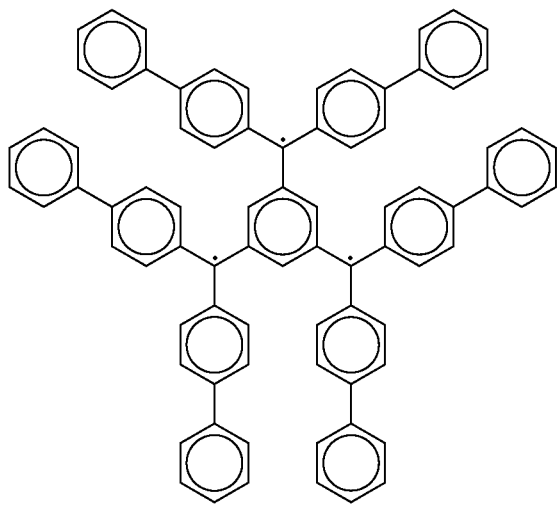
[15]
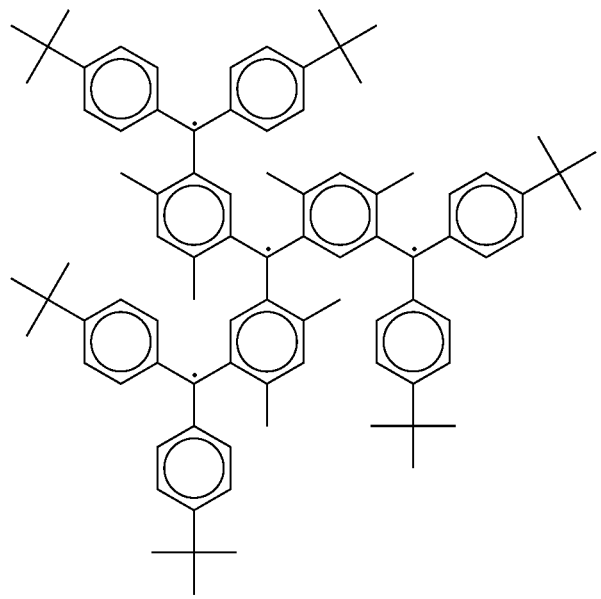
[16]
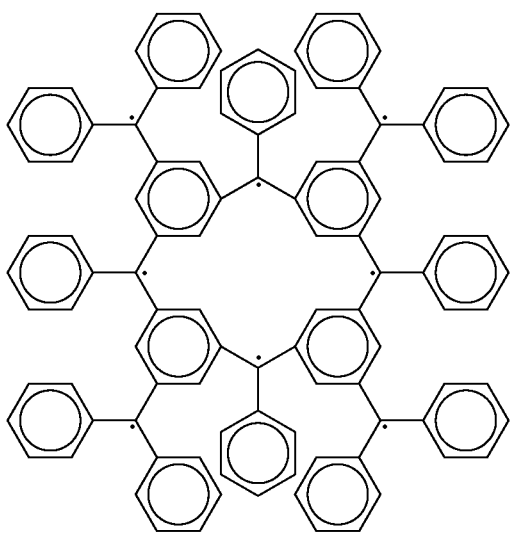
[17]
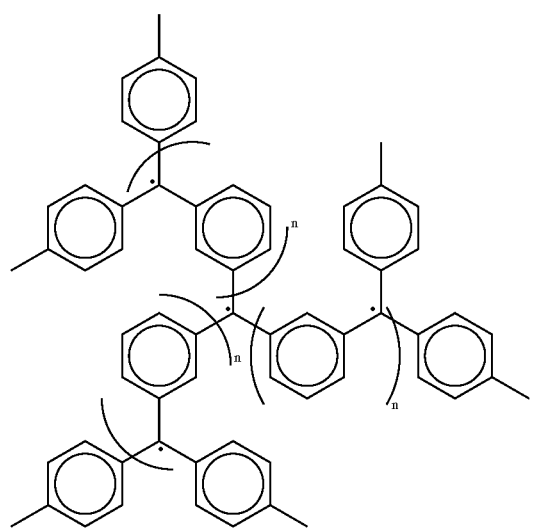
[18]
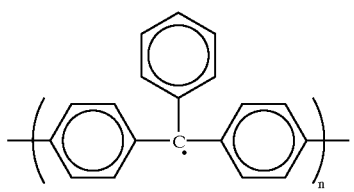
[19]
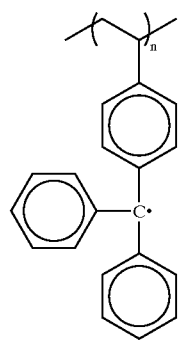

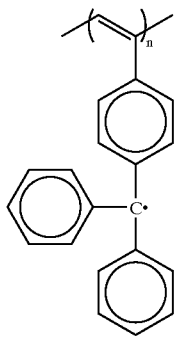
[20]
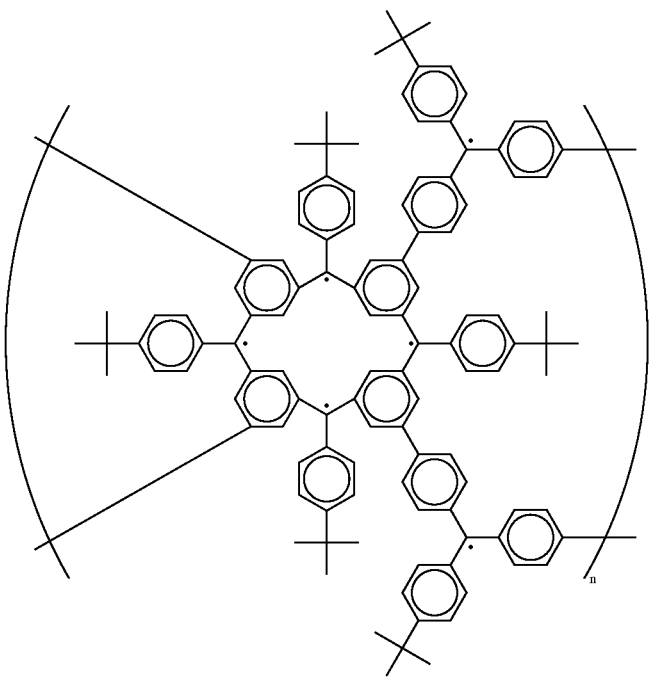
[21]
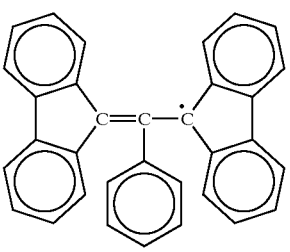
[22]
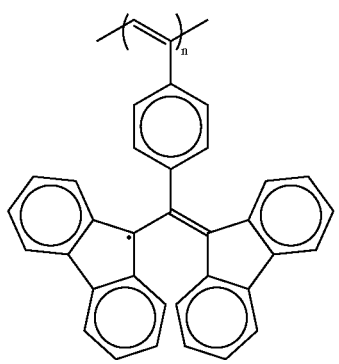
[23]

-continued
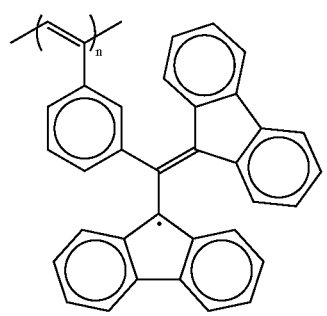
[24]
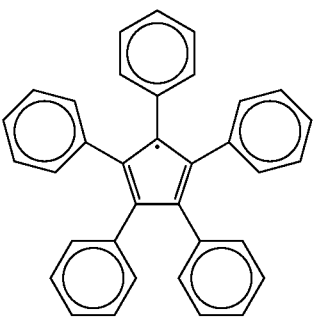
[25]
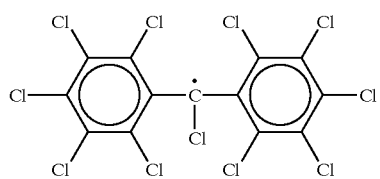
[26]
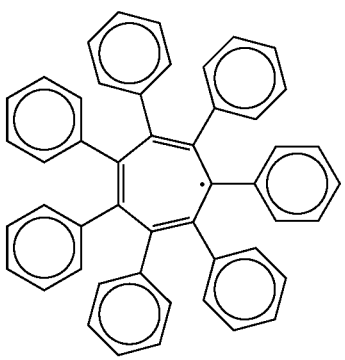
[27]
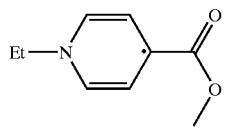
[28]
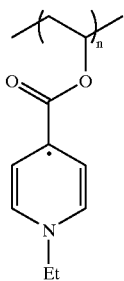
[29]
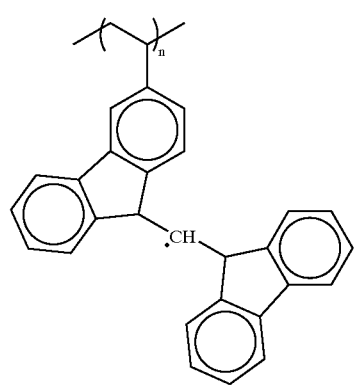
[30]
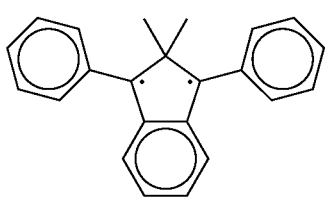
[31]

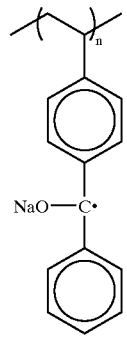

What is claimed is:

1. A battery for generating electric power through an electrode reaction, comprising:
a pair of electrodes comprising two kinds of active material, at least one of said two kinds of active material comprising a neutral carbon radical compound,
wherein said neutral carbon radical compound is expressed by general formula

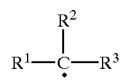

wherein each of the substituents $R^1$, $R^2$ and $R^3$ for the neutral carbon radical compound is selected from the group consisting of a hydroxyl group, a nitro group, a nitroso group, a cyano group, an alkyl group, an alkenyl group, a cycloalkyl group, an aromatic group, an aralkyl group, an amino group, an alkoxy group, an aryloxy group, an alkoxycarbonyl group, an aryloxycarbonyl group, an acyl group and a carboxyl group,
wherein at least one atom of said substituents $R^1$, $R^2$ and $R^3$ is substituted by another atom selected from sulfur atom, silicon atom, phosphorous atom and boron atom.

2. A battery for generating electric power through an electrode reaction, comprising:
a pair of electrodes comprising two kinds of active material, at least one of said two kinds of active material comprising a neutral carbon radical compound,
wherein said neutral carbon radical compound is expressed by general formula

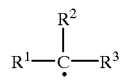

wherein each of the substituents $R^1$, $R^2$ and $R^3$ for the neutral carbon radical compound is selected from the group consisting of a hydrogen atom, a halogen atom, a hydroxyl group, a nitro group, a nitroso group, a cyano group, an alkyl group, an alkenyl group, a cycloalkyl group, an aromatic group, an aralkyl group, an amino group, an alkoxy group, an aryloxy group, an alkoxycarbonyl group, an aryloxycarbonyl group, an acyl group and a carboxyl group, and
wherein one of said substituents $R^1$, $R^2$ and $R^3$ comprises a salt formed by reacting a hydroxyl group with a metal atom.

3. A battery for generating electric power through an electrode reaction, comprising:
a pair of electrodes comprising two kinds of active material, at least one of said two kinds of active material comprising a neutral carbon radical compound,
wherein said neutral carbon radical compound is expressed by general formula

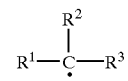

wherein each of the substituents $R^1$, $R^2$ and $R^3$ for the neutral carbon radical compound is selected from the group consisting of a hydrogen atom, a halogen atom, a hydroxyl group, a nitro group, a nitroso group, a cyano group, an alkyl group, an alkenyl group, a cycloalkyl group, an aromatic group, an aralkyl group, an amino group, an alkoxy group, an aryloxy group, an alkoxycarbonyl group, an aryloxycarbonyl group, an acyl group and a carboxyl group, and
wherein at least one of said substituents $R^1$, $R^2$ and $R^3$ forms a polyradical together with another molecule of said neutral carbon radical compound.

4. The battery as set forth in claim 3, wherein said polyradical comprises a structure selected from the group consisting of a chain, a ring and a branched structure.

5. A battery for generating electric power through an electrode reaction, comprising:
a pair of electrodes comprising two kinds of active material, at least one of said two kinds of active material comprising a neutral carbon radical compound,
wherein said neutral carbon radical compound is expressed by general formula

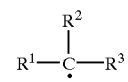

wherein each of the substituents $R^1$, $R^2$ and $R^3$ for the neutral carbon radical compound is selected from the group consisting of a hydrogen atom, a halogen atom, a hydroxyl group, a nitro group, a nitroso group, a cyano group, an alkyl group, an alkenyl group, a cycloalkyl group, an aromatic group, an aralkyl group, an amino group, an alkoxy group, an aryloxy group, an alkoxycarbonyl group, an aryloxycarbonyl group, an acyl group and a carboxyl group, and wherein at least one of said substituents $R^1$, $R^2$ and $R^3$ is bonded to the carbon radicals of said more than one molecule for producing a polyradical.

6. The battery as set forth in claim 5, wherein said polyradical comprises a structure selected from the group consisting of a chain, a ring and a branched structure.

7. A battery for generating electric power through an electrode reaction, comprising:

a pair of electrodes comprising two kinds of active material at least one of said two kinds of active material comprising a neutral carbon radical compound, wherein said neutral carbon radical compound is expressed by general formula

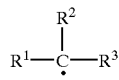

and wherein each of said substituents $R^1$, $R^2$ and $R^3$ comprises one of an aromatic group and a substituted group thereof.

8. The battery as set forth in claim 7, wherein said aromatic group comprises a phenyl group.

9. A battery for generating electric power through an electrode reaction, comprising:

a pair of electrodes comprising two kinds of active material, at least one of said two kinds of active material comprising a neutral carbon radical compound, wherein said neutral carbon radical compound is expressed by general formula

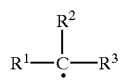

wherein each of the substituents $R^1$, $R^2$ and $R^3$ for the neutral carbon radical compound is selected from the group consisting of a hydrogen atom, a halogen atom, a hydroxyl group, a nitro group, a nitroso group, a cyano group, an alkyl group, an alkenyl group, a cycloalkyl group, an aromatic group, an aralkyl group, an amino group, an alkoxy group, an aryloxy group, an alkoxycarbonyl group, an aryloxycarbonyl group, an acyl group and a carboxyl group, wherein said neutral carbon radical compound comprises one of a 9-fluorenyl radical or and a substituted 9-fluorenyl radical.

10. A battery for generating electric power through an electrode reaction, comprising:

a pair of electrodes comprising two kinds of active material, at least one of said two kinds of active material comprising a neutral carbon radical compound, wherein said neutral carbon radical compound is expressed by general formula

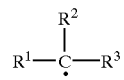

wherein each of the substituents $R^1$, $R^2$ and $R^3$ for the neutral carbon radical compound is selected from the group consisting of a hydrogen atom, a halogen atom, a hydroxyl group, a nitro group, a nitroso group, a cyano group, an alkyl group, an alkenyl group, a cycloalkyl group, an aromatic group, an aralkyl group, an amino group, an alkoxy group, an aryloxy group, an alkoxycarbonyl group, an aryloxycarbonyl group, an acyl group and a carboxyl group, wherein said neutral carbon radical compound comprises a high-molecular weight radical compound, and wherein said high-molecular weight radical compound comprises a polyolefin structure.

11. A battery for generating electric power through an electrode reaction, comprising:

a pair of electrodes comprising two kinds of active material, at least one of said two kinds of active material comprising a neutral carbon radical compound, wherein said neutral carbon radical compound is expressed by general formula

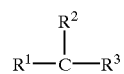

wherein each of the substituents $R^1$, $R^2$ and $R^3$ for the neutral carbon radical compound is selected from the group consisting of a hydrogen atom, a halogen atom, a hydroxyl group, a nitro group, a nitroso group, a cyano group, an alkyl group, an alkenyl group, a cycloalkyl group, an aromatic group, an aralkyl group, an amino group, an alkoxy group, an aryloxy group, an alkoxycarbonyl group, an aryloxycarbonyl group, an acyl group and a carboxyl group, wherein said neutral carbon radical compound comprises a high-molecular weight radical compound, and wherein said high-molecular weight radical compound comprises a polyacetylene structure.

* * * * *